(12) United States Patent    (10) Patent No.: US 9,260,184 B2
Olm et al.                   (45) Date of Patent: Feb. 16, 2016

(54) COMPACT UNMANNED ROTARY AIRCRAFT

(71) Applicant: DRAGANFLY INNOVATIONS INC., Saskatoon, Saskatchewan (CA)

(72) Inventors: Orville Olm, Saskatchewan (CA); Greg Wood, Saskatchewan (CA); Zenon Dragan, Saskatchewan (CA)

(73) Assignee: Zenon Dragan, Saskatchewan (CA)

( * ) Notice: Subject to any disclaimer, the term of this patent is extended or adjusted under 35 U.S.C. 154(b) by 0 days.

(21) Appl. No.: 14/277,370

(22) Filed: May 14, 2014

(65) Prior Publication Data

US 2014/0339355 A1    Nov. 20, 2014

(30) Foreign Application Priority Data

May 15, 2013 (CA) ................................. 2815885

(51) Int. Cl.
  B64C 27/08    (2006.01)
  B64C 39/02    (2006.01)
(52) U.S. Cl.
  CPC ............. *B64C 27/08* (2013.01); *B64C 39/024* (2013.01); *B64C 2201/027* (2013.01); *B64C 2201/108* (2013.01); *B64C 2201/20* (2013.01)
(58) Field of Classification Search
  None
  See application file for complete search history.

(56) References Cited

U.S. PATENT DOCUMENTS

| 1,400,032 | A | * | 12/1921 | Dickey | 403/257 |
|---|---|---|---|---|---|
| 2,478,847 | A | * | 8/1949 | Stuart | 244/7 R |
| 4,161,843 | A | * | 7/1979 | Hui | 446/37 |
| 4,477,228 | A | * | 10/1984 | Duffy et al. | 416/241 A |
| 5,201,679 | A | * | 4/1993 | Velte et al. | 440/49 |
| 7,086,843 | B2 | * | 8/2006 | Cheng | 417/423.1 |
| 7,200,982 | B2 | * | 4/2007 | Vandyke | 56/17.5 |
| 7,699,260 | B2 | * | 4/2010 | Hughey | 244/17.23 |
| 8,052,081 | B2 | * | 11/2011 | Olm et al. | 244/17.23 |
| 8,328,130 | B2 | * | 12/2012 | Goossen | 244/23 A |
| 8,646,720 | B2 | * | 2/2014 | Shaw | 244/17.23 |
| 8,662,438 | B2 | * | 3/2014 | Savoye et al. | 244/17.13 |
| 8,695,919 | B2 | * | 4/2014 | Shachor et al. | 244/17.17 |
| 8,753,155 | B2 | * | 6/2014 | Olm et al. | 440/12.66 |
| 8,794,564 | B2 | * | 8/2014 | Hutson | 244/17.17 |
| 8,794,566 | B2 | * | 8/2014 | Hutson | 244/17.23 |
| 8,919,691 | B2 | * | 12/2014 | Lindmark et al. | 244/17.11 |
| 2002/0104922 | A1 | * | 8/2002 | Nakamura | 244/17.25 |
| 2005/0061910 | A1 | * | 3/2005 | Wobben | 244/17.23 |
| 2006/0226281 | A1 | * | 10/2006 | Walton | 244/17.23 |
| 2008/0006737 | A1 | * | 1/2008 | Wobben | 244/17.13 |
| 2008/0048065 | A1 | * | 2/2008 | Kuntz | 244/17.23 |
| 2009/0008499 | A1 | * | 1/2009 | Shaw | 244/17.23 |
| 2009/0250549 | A1 | * | 10/2009 | Wiggerich | 244/17.11 |
| 2009/0283629 | A1 | * | 11/2009 | Kroetsch et al. | 244/17.23 |
| 2010/0044499 | A1 | * | 2/2010 | Dragan et al. | 244/17.23 |

(Continued)

*Primary Examiner* — Medhat Badawi
(74) *Attorney, Agent, or Firm* — Nixon & Vanderhye P.C.

(57) ABSTRACT

A rotary wing aircraft apparatus has arms extending from a body, and a rotor assembly attached to an end of each arm. Each rotor assembly has a rotor blade releasably attached by a lock mechanism. A clockwise rotor blade is releasably attached to a first rotor assembly by engagement in a clockwise lock mechanism, and a counterclockwise rotor blade is releasably attached to a second rotor assembly by engagement in a counterclockwise lock mechanism. The clockwise rotor blade is engageable only with the clockwise lock mechanism and the counterclockwise rotor blade is engageable only with the counterclockwise lock mechanism and cannot be engaged in the clockwise lock mechanism. A leg extends down from each rotor assembly to support the apparatus on the ground.

11 Claims, 4 Drawing Sheets

(56) References Cited

U.S. PATENT DOCUMENTS

| | | | |
|---|---|---|---|
| 2010/0140415 A1* | 6/2010 | Goossen | 244/23 A |
| 2010/0243794 A1* | 9/2010 | Jermyn | 244/17.23 |
| 2011/0001020 A1* | 1/2011 | Forgac | 244/7 A |
| 2011/0017865 A1* | 1/2011 | Achtelik et al. | 244/17.23 |
| 2011/0226892 A1* | 9/2011 | Crowther et al. | 244/17.23 |
| 2012/0241553 A1* | 9/2012 | Wilke | 244/17.13 |
| 2013/0068892 A1* | 3/2013 | Bin Desa et al. | 244/190 |
| 2014/0061362 A1* | 3/2014 | Olm et al. | 244/2 |
| 2014/0117149 A1* | 5/2014 | Zhou et al. | 244/17.23 |
| 2014/0131510 A1* | 5/2014 | Wang et al. | 244/17.23 |
| 2014/0138476 A1* | 5/2014 | Bystrom | 244/17.13 |
| 2014/0138477 A1* | 5/2014 | Keennon et al. | 244/17.23 |
| 2014/0263823 A1* | 9/2014 | Wang et al. | 244/17.23 |

* cited by examiner

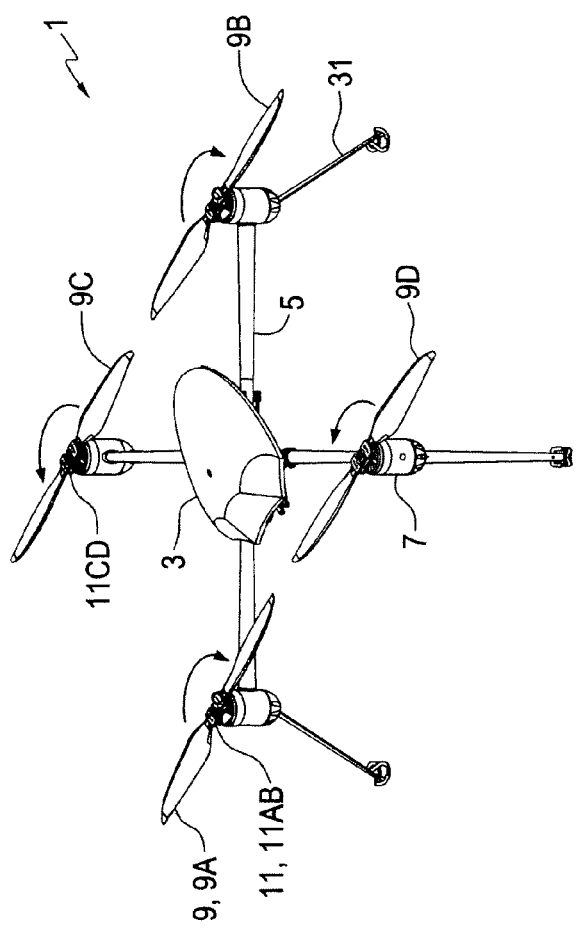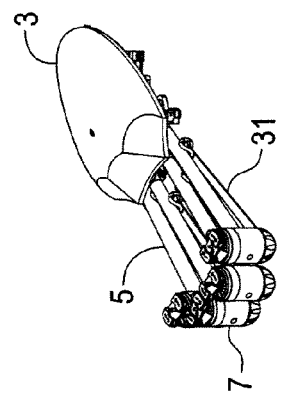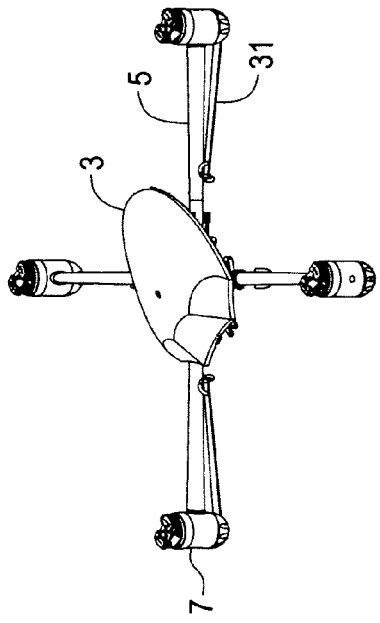
FIG. 1
FIG. 2
FIG. 3

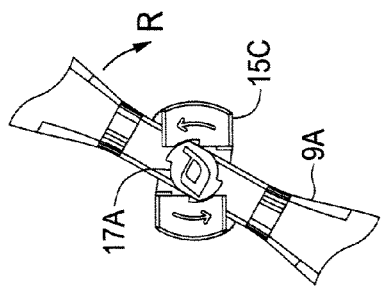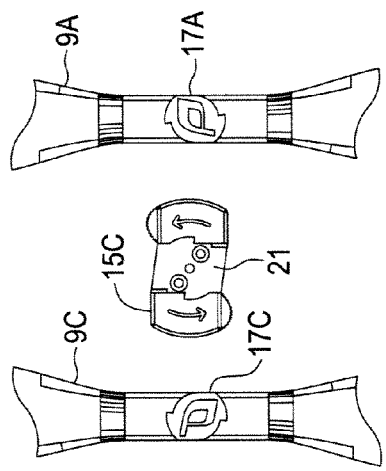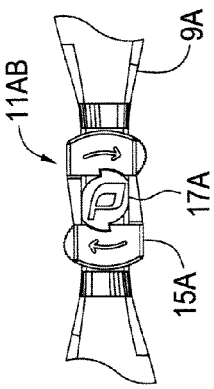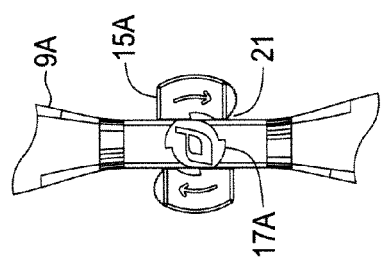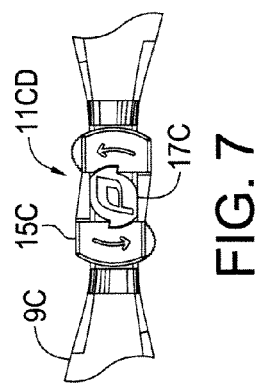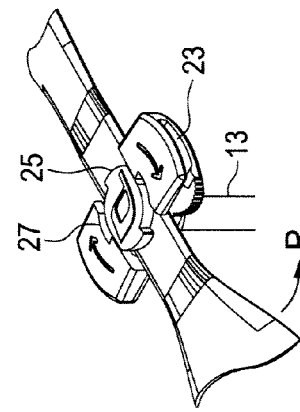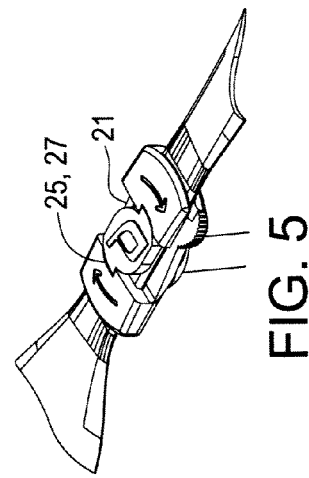

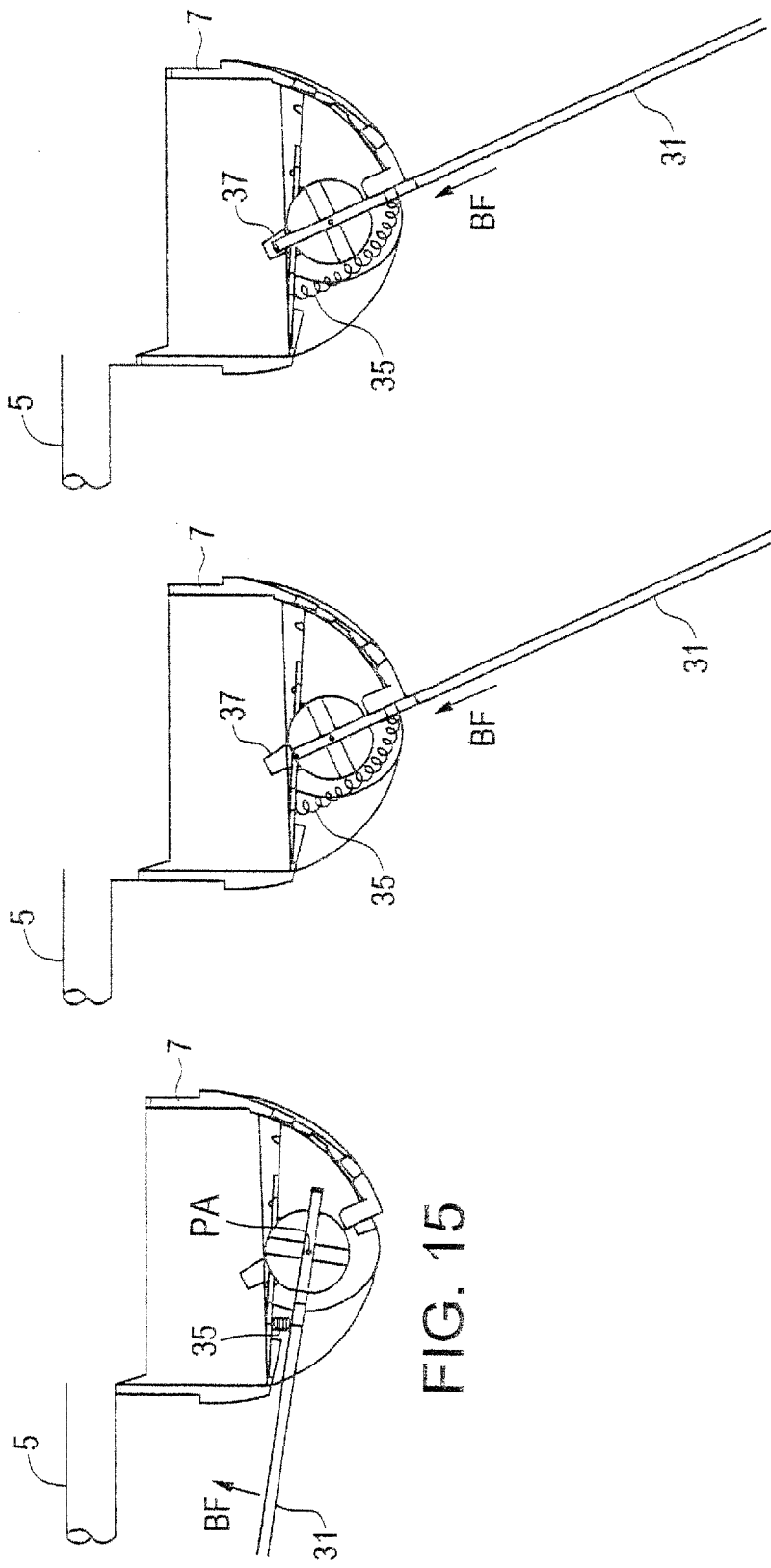

COMPACT UNMANNED ROTARY AIRCRAFT

CROSS-REFERENCE TO RELATED APPLICATIONS

This application claims priority to Canadian Patent Application No. 2815885 filed May 15, 2013, the entire content of which is hereby incorporated by reference.

This disclosure relates to the field of unmanned rotary aircraft or helicopters and more particularly rotary aircraft with a compact storage configuration.

BACKGROUND

Unmanned remote control rotary aircraft have recently become popular for recreation and also in larger and more sophisticated versions for surveillance by military and police personnel. One popular configuration includes a number of arms extending laterally from the aircraft body, with a rotor assembly on the end of each arm. The rotor assemblies sometimes have upper and lower rotors that rotate in opposite directions to avoid exerting torque on the body which would cause it to spin.

Where the rotor assemblies have a single rotor, torque on the body from the rotational motion of the rotors is avoided by having the rotors rotate in opposite directions. The vertical lift is the same, but the torque imparted by rotation in one direction is cancelled out by the rotation in the opposite direction. Where an even number of arms and rotor assemblies is used, the rotational forces cancel each other and the body is substantially stable.

Where an uneven number of arms and rotor assemblies is used, such as in the popular three rotor configuration, two rotors spin in one direction and the third spins in the opposite direction. The rotational axis of the third rotor is then tilted slightly away from vertical so it exerts a horizontal force component that counteracts the torque force exerted by the other rotors, again resulting in a stable body. The degree of tilt can be adjusted by rotating the arm to adjust for varying rotor speeds.

Such multi-rotor unmanned remote control rotary aircraft are disclosed for example in U.S. Pat. Nos. 8,052,081 and 8,292,215 to the present inventors Olm et al. To make the aircraft more compact for storage and transport the rotors can be removed and the arms folded into a side by side orientation. Although not shown in the patents, a leg assembly is typically attached to the bottom of the aircraft body, and to support the aircraft on the ground in the necessary orientation for landing and takeoff.

SUMMARY OF THE INVENTION

The present disclosure provides a rotary aircraft apparatus that overcomes problems in the prior art.

In a first embodiment the present disclosure provides a rotary wing aircraft apparatus comprising a body, a plurality of arms extending laterally from the body, and a rotor assembly attached to an outside end of each arm. Each rotor assembly comprises a rotor blade releasably attached to a driveshaft by a lock mechanism, and a drive rotating the driveshaft. A first driveshaft rotates in a clockwise direction and a second driveshaft rotates in a counterclockwise direction. A clockwise rotor blade is releasably attached to the first driveshaft by engagement in a clockwise lock mechanism and generates a vertical lift force when rotated in the clockwise direction, and a counterclockwise rotor blade is releasably attached to the second driveshaft by engagement in a counterclockwise lock mechanism and generates a vertical lift force when rotated in the counterclockwise direction. The clockwise rotor blade is engageable only with the clockwise lock mechanism and cannot be engaged in the counterclockwise lock mechanism, and the counterclockwise rotor blade is engageable only with the counterclockwise lock mechanism and cannot be engaged in the clockwise lock mechanism.

In a second embodiment the present disclosure provides a rotary wing aircraft apparatus comprising a body, a plurality of arms extending laterally from the body, and a rotor assembly attached to an outside end of each arm, each rotor assembly comprising a rotor blade and a drive operative to rotate the rotor blade. Each rotor assembly comprises a leg extending downward from a bottom portion of the rotor assembly to support the apparatus on a ground surface.

The rotor blades can be easily detached for transport of storage, and cannot be placed on driveshafts rotating the wrong direction. Legs extending down from the rotor assemblies increase stability allowing landing upright and operational on steep slopes. The legs can also be conveniently folded for storage.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic perspective view of an embodiment of a rotary wing aircraft apparatus of the present disclosure with arms and legs in the operating position, and rotor blades installed;

FIG. 2 is a schematic perspective view of the embodiment of FIG. 1 with legs in the stored position, and rotor blades removed;

FIG. 3 is a schematic perspective view of the embodiment of FIG. 1 with legs in the stored position, rotor blades removed, and the arms folded;

FIG. 4 is a schematic perspective view of clockwise lock mechanism used to attach clockwise rotor blades in the embodiment of FIG. 1 with the rotor blade in the recess ready for engagement or removal;

FIG. 5 is a schematic perspective view of clockwise lock mechanism of FIG. 4 with the rotor blade engaged and locked in the lock mechanism;

FIG. 6 is a top view of the shaft lock portion of a counterclockwise lock mechanism with a counterclockwise rotor blade on one side and a clockwise rotor blade on the other side;

FIG. 7 shows the counterclockwise rotor blade installed in the shaft lock portion of the counterclockwise lock mechanism of FIG. 6;

FIG. 8 shows the clockwise rotor blade blocked from engagement and installation in the shaft lock portion of the counterclockwise lock mechanism of FIG. 6;

FIG. 9 is a top view of the shaft lock portion of a clockwise lock mechanism with a clockwise rotor blade in the recess ready for engagement or removal;

FIG. 10 shows the clockwise rotor blade of FIG. 9 installed in the shaft lock portion of the clockwise lock mechanism;

FIG. 15 is a schematic cut away side view of a leg latch mechanism for operating the legs of the embodiment of FIG. 1, with the leg in the stored position;

FIG. 16 is a schematic cut away side view of the leg latch mechanism of FIG. 15 with the leg in the operating position but not yet engaged in the recess and thus not latched;

FIG. 17 is a schematic cut away side view of the leg latch mechanism of FIG. 15 with the leg in the operating position and latched.

DETAILED DESCRIPTION OF THE ILLUSTRATED EMBODIMENTS

Figure 11:
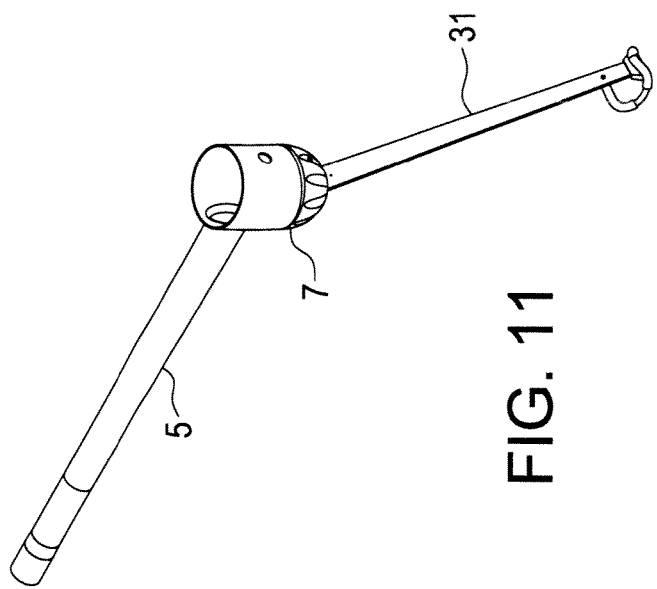
FIGS. 11 and 12 show respectively perspective and side views of a leg of the embodiment of FIG. 1 in the operating position.

FIGS. 1-3 schematically illustrate an embodiment of a rotary wing aircraft apparatus 1 of the present disclosure. The apparatus 1 comprises a body 3, and a plurality of arms 5 extending laterally from the body 3. A rotor assembly 7 is attached to an outside end of each arm 5. Each rotor assembly 7 comprises a rotor blade 9 releasably attached to a driveshaft by a lock mechanism 11, and a drive, typically an electric motor, rotating the driveshaft.

FIG. 2 shows the apparatus 1 with rotor blades removed and support legs in the stored position as described further below. In the illustrated apparatus 1 the arms 5 are movably attached to the body 3 such that the arms 5 can be moved from a flying position illustrated in FIG. 1, where the arms extend forward and rearward laterally outward from the body 3 such that the arms 5 are substantially equally spaced, to a folded stored position illustrated in FIG. 3 where the arms are generally aligned with and adjacent to each other.

The illustrated apparatus 1 has four arms 5 and corresponding rotor assemblies 7, and as is known in the art, two of the rotor blades 9A, 9B rotate in a clockwise direction and generate a vertical lift force when rotated in the clockwise direction, while the other two rotor blades 9C, 9D rotate in a counterclockwise direction and generate a vertical lift force when rotated in the clockwise direction.

The operation of the lock mechanisms 11 is illustrated in FIGS. 4-10. Each clockwise rotor blade 9A, 9B is releasably attached to the corresponding driveshaft 13 by engagement in a clockwise lock mechanism 11AB and each counterclockwise rotor blade 9C, 9D is releasably attached to the corresponding driveshaft 13 by engagement in a counterclockwise lock mechanism 11CD.

It will be appreciated that in order for the apparatus 1 to operate properly, the rotor blades 9 must be mounted to driveshafts that are rotating in the correct direction. To ensure that the correct positioning, the clockwise rotor blades 9A, 9B are engageable only with the clockwise lock mechanisms 11AB and cannot be engaged in the counterclockwise lock mechanisms 11CD, and similarly the counterclockwise rotor blades 9C, 9D are engageable only with the counterclockwise lock mechanisms 11CD and cannot be engaged in the clockwise lock mechanisms 11AB.

Each clockwise lock mechanism 11AB comprises a shaft lock portion 15A attached to the corresponding clockwise rotating driveshaft and a blade lock portion 17A attached to the clockwise rotor blade 9A, 9B. Similarly each counterclockwise lock mechanism 11CD comprises a shaft lock portion 15C attached to the corresponding counterclockwise rotating driveshaft and a blade lock portion 17C attached to the counterclockwise rotor blade 9C, 9D.

FIGS. 4 and 5 show the operation of the lock mechanisms 11. A clockwise lock mechanism 11A is illustrated with the shaft lock portion 15A attached to a clockwise rotating driveshaft 13. Arrows on the shaft lock portion 15A indicate the rotational direction, and the shaft lock portion defines a recess 21 in the middle between the arrows. The blade lock portion 17A of the lock mechanism 11A on the clockwise rotor blade 9A is dropped into the recess 21 as seen in FIG. 4 and the rotor blade 9A is then rotated in direction R opposite to the direction of the arrows such that the blade 9A slides into slots 23 on each side of the shaft lock portion 15A under the arrows, and lugs 25A on the blade lock portion 17A engage notches 27A defined by the shaft lock portion as seen in FIG. 5.

The blade lock portion 17A of the clockwise lock mechanisms 11A are rotated counterclockwise with respect to the shaft lock portion 15A thereof to push the blade into the slots 23 to releasably attach the clockwise rotor blade 9A to the shaft lock portion 15A and thus to the driveshaft 13. During operation the shaft lock portion 15A exerts a force in the direction of the arrows on the rotor blade to rotate same, and this force keeps the blade engaged in the slots 23. The counterclockwise lock mechanism 11C operates in a similar fashion with an opposite spin direction.

FIG. 6 shows the shaft lock portion 15C, with recess 21, of a counterclockwise lock mechanism with a counterclockwise rotor blade 9C, with blade lock portion 17C, on one side and a clockwise rotor blade 9A, with blade lock portion 17A, on the other side. FIG. 7 shows the blade lock portion 17C of the counterclockwise rotor blade 9C successfully installed in the shaft lock portion 15C to form a counterclockwise lock mechanism 11CD.

FIG. 8 shows that the blade lock portion 17A of the clockwise rotor blade 9A is prevented from rotating in direction R as required by contact of the lugs 17A with the oppositely configured notches 27C of the shaft lock portion 15C. Thus the clockwise rotor blades 9A, 9B cannot be installed on the shaft lock portion 15C of a counterclockwise lock mechanism, and similarly the counterclockwise rotor blades 9C, 9D cannot be installed on the shaft lock portion 15A of a clockwise lock mechanism.

FIG. 9 shows the blade lock portion 17A of the clockwise rotor blade 9A placed in the recess 21 of a correctly selected clockwise shaft lock portion 15A, and FIG. 10 shows the blade lock portion 17A successfully installed in the shaft lock portion 15A to form a clockwise lock mechanism 11AB.

Commonly in the prior art the rotary aircraft is supported on a leg structure attached under the body. Stability of the aircraft on the ground is improved in present apparatus 1 where each rotor assembly 7 has a leg 31 pivotally attached to a bottom portion of the rotor assembly 7, as illustrated in FIGS. 11-17. Each leg 31 is movable from a stored position as illustrated in FIG. 2, where the leg 31 extends laterally from the rotor assembly 7 along the arm 5 supporting the rotor assembly, to an operating position as illustrated in FIG. 1, where the leg extends downward from the rotor assembly 7.

It can be seen in Fig. that the bottom ends of the legs 31 in the operating position are much farther apart than would be practical with a leg structure mounted to the body 3. The apparatus can thus land on a considerable slope if necessary. Beneficially the legs 31 are made from a strong yet light and somewhat flexible material to cushion the apparatus 1 on landing. A carbon-fiber-reinforced polymer material could be used for example. While stationary legs as shown in FIG. 1 provide increased stability, same are awkward for storage and transport, and interfere with folding arms.

In the illustrated apparatus 1 each leg 31 is therefore is pivotally attached to the bottom portion of the rotor assembly 7 such that the leg is movable from a stored position, where the leg 31 extends laterally from the rotor assembly 7 along the arm 5 supporting the rotor assembly 7, to an operating position where the leg 31 extends downward from the rotor assembly 7.

Figure 12:
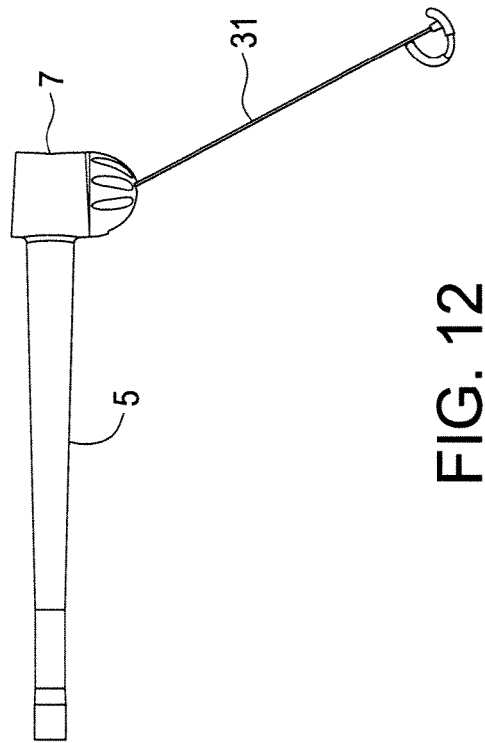
Figure 13:
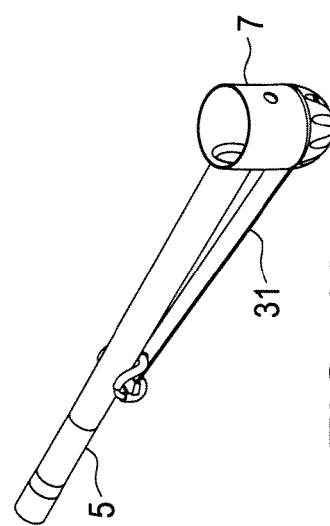
FIGS. 13 and 14 show respectively perspective and side views of the leg of FIGS. 11 and 12 in the stored position.
Figure 14:
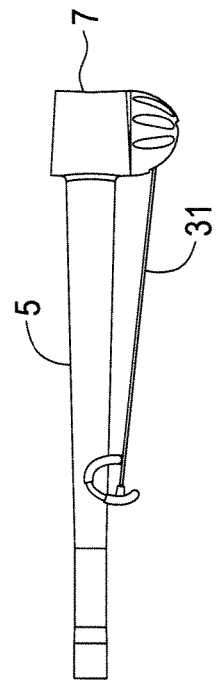

FIGS. 11 and 12 show one of the legs in the operating position, where the leg 31 slopes from the rotor assembly 7 downward and away from the body at the opposite inner end of the arm 5. FIGS. 13 and 14 show the leg 31 in the stored position, where a saddle 33 on the bottom end of the leg 31 engages the arm 5 to reduce the risk that the leg 31 may be forced laterally and damaged during transport to a use site.

In the illustrated apparatus 1, as seen in FIGS. 15-17, each leg 31 is pivotally attached to the bottom of the rotor assembly 7 about a pivot axis PA that is substantially perpendicular to the arm 5. A bias element, illustrated as spring 35, urges the leg 31 toward the stored position shown in FIG. 1. To move to the operating position, the operator pivots the leg 31 against the bias force BF to the operating position shown in FIG. 16, where the upper end of the leg 31 is aligned with a recess 37 in the rotor assembly 7 and the bias force BF draws the leg into the recess 37. The end of the leg 31 in the recess 37 acts then as a latch to lock the leg 31 in the operating position.

The rotor blades of the illustrated apparatus 1 can be easily detached for transport of storage, and cannot be placed on driveshafts rotating the wrong direction. The legs extending down from the rotor assemblies significantly increase stability allowing the apparatus 1 to land on a steep slope without falling over and becoming inoperative. The legs can also be conveniently folded for storage.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rotary wing aircraft apparatus comprising:
   a body;
   a plurality of arms extending laterally from the body, and a rotor assembly attached to an outside end of each arm;
   each rotor assembly comprising a rotor blade releasably attached to a driveshaft by a lock mechanism, and a drive rotating the driveshaft;
   wherein a first driveshaft rotates in a clockwise direction and a second driveshaft rotates in a counterclockwise direction;
   wherein a clockwise rotor blade is releasably attached to the first driveshaft by engagement in a clockwise lock mechanism and generates a vertical lift force when rotated in the clockwise direction, and a counterclockwise rotor blade is releasably attached to the second driveshaft by engagement in a counterclockwise lock mechanism and generates a vertical lift force when rotated in the counterclockwise direction;
   wherein the clockwise rotor blade is engageable only with the clockwise lock mechanism and cannot be engaged in the counterclockwise lock mechanism, and the counterclockwise rotor blade is engageable only with the counterclockwise lock mechanism and cannot be engaged in the clockwise lock mechanism; and
   wherein the clockwise lock mechanism comprises a shaft lock portion attached to the first driveshaft and a blade lock portion attached to the clockwise rotor blade, the shaft lock portion defining notches configured to engage corresponding lugs on the blade lock portion.

2. The apparatus of claim 1 wherein the counterclockwise lock mechanism comprises a shaft lock portion attached to the second driveshaft and a blade lock portion attached to the counterclockwise rotor blade, the blade lock portion comprising lugs with a configuration that is different than a configuration of the lugs on the blade lock portion of the clockwise lock mechanism.

3. The apparatus of claim 1 wherein the blade lock portion of the clockwise lock mechanism is rotated counterclockwise with respect to the shaft lock portion thereof to releasably attach the clockwise rotor blade to the first driveshaft.

4. The apparatus of claim 3 wherein the blade lock portion of the counterclockwise lock mechanism is rotated clockwise with respect to the shaft lock portion thereof to releasably attach the counterclockwise rotor blade to the second driveshaft.

5. The apparatus of claim 1 wherein each rotor assembly comprises a leg extending downward from a bottom portion of the rotor assembly to support the apparatus on a ground surface.

6. The apparatus of claim 5 wherein the leg slopes downward and away from the body.

7. The apparatus of claim 5 wherein each leg is pivotally attached to the bottom portion of the rotor assembly such that the leg is movable from a stored position, where the leg extends laterally from the rotor assembly along the arm supporting the rotor assembly, to an operating position where the leg extends downward from the rotor assembly.

8. The apparatus of claim 7 comprising a bias element urging the leg toward the stored position, and a latch operative to lock the leg in the operating position.

9. The apparatus of claim 7 wherein the leg slopes downward and away from the body when in the operating position.

10. The apparatus of claim 7 wherein a bottom end of the leg engages the arm when in the stored position.

11. The apparatus of claim 1 wherein the arms are movably attached to the body such that the arms can be moved from a flying position, where the arms extend forward and rearward laterally outward from the body such that the arms are substantially equally spaced, to a folded stored position where at least one arm is substantially aligned with and adjacent to another arm.

* * * * *